(12) United States Patent
Webb et al.

(10) Patent No.: US 10,131,229 B2
(45) Date of Patent: Nov. 20, 2018

(54) ELECTRONIC METER CLUSTER FOR A VEHICLE

(71) Applicants: DENSO International America, Inc., Southfield, MI (US); DENSO CORPORATION, Kariya-shi, Aichi-ken (JP)

(72) Inventors: Gareth Webb, Farmington, MI (US); Dustin Garrett, Coleman, MI (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/372,498

(22) Filed: Dec. 8, 2016

(65) Prior Publication Data

US 2018/0162225 A1 Jun. 14, 2018

(51) Int. Cl.
| | |
|---|---|
| *B60K 35/00* | (2006.01) |
| *B60K 37/02* | (2006.01) |
| *G06F 3/14* | (2006.01) |
| *G06T 11/20* | (2006.01) |
| *G06T 11/60* | (2006.01) |

(52) U.S. Cl.
CPC .............. *B60K 35/00* (2013.01); *B60K 37/02* (2013.01); *B60K 2350/1076* (2013.01); *B60K 2350/2008* (2013.01); *B60K 2350/2069* (2013.01); *B60K 2350/352* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 2008/0258892 | A1* | 10/2008 | Itoh ........................ | B60K 37/02 340/441 |
| 2012/0019374 | A1* | 1/2012 | Nishiyama ............. | B60K 35/00 340/438 |
| 2015/0109756 | A1* | 4/2015 | Choi ...................... | B60K 37/02 362/23.01 |
| 2016/0082876 | A1* | 3/2016 | Dyer .................... | G01D 13/265 340/441 |

FOREIGN PATENT DOCUMENTS

JP 2010266288 A 11/2010

* cited by examiner

*Primary Examiner* — Tize Ma
(74) *Attorney, Agent, or Firm* — Harness, Dickey & Pierce, P.L.C.

(57) ABSTRACT

An electronic meter cluster system for a vehicle. The system includes a display screen and a meter control module configured to control the display screen. For example, the meter control module is configured to control the display screen to display a meter for conveying information to a driver of the vehicle, the meter including numerals and a pointer needle. The meter control module arranges the needle relative to the numerals to convey information to the driver. Based on a change in the information being conveyed to the driver, the meter control module is configured to modify at least one of sharpness of the numerals, size of the numerals, one or more colors of the display, brightness of the needle, and length of the needle.

11 Claims, 4 Drawing Sheets

ELECTRONIC METER CLUSTER FOR A VEHICLE

FIELD

The present disclosure relates to a meter cluster, such as a meter cluster of a vehicle dashboard for example.

BACKGROUND

This section provides background information related to the present disclosure, which is not necessarily prior art.

Vehicles typically include a meter cluster configured to convey various types of information to a driver of the vehicle, such as the vehicle speed, engine speed, engine temperature, fuel level, etc. More recently, the meter cluster has become partially or entirely electronic. Thus the meter cluster is often displayed on a display screen configured to electronically display information to the driver. While current meter cluster systems are suitable for their intended use, they are subject to improvement. For example, an electronic meter cluster system able to more clearly convey information to the driver would be desirable. The present teachings advantageously provide such an electronic meter cluster system, which has numerous advantages over current meter clusters as explained herein and as one skilled in the art will recognize.

SUMMARY

This section provides a general summary of the disclosure, and is not a comprehensive disclosure of its full scope or all of its features.

The present teachings provide for an electronic meter cluster system for a vehicle. The system includes a display screen and a meter control module configured to control the display screen. For example, the meter control module is configured to control the display screen to display a meter for conveying information to a driver of the vehicle, the meter including numerals and a pointer needle. The meter control module arranges the needle relative to the numerals to convey information to the driver. Based on a change in the information being conveyed to the driver, the meter control module is configured to modify at least one of sharpness of the numerals, size of the numerals, one or more colors of the display, brightness of the needle, and length of the needle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
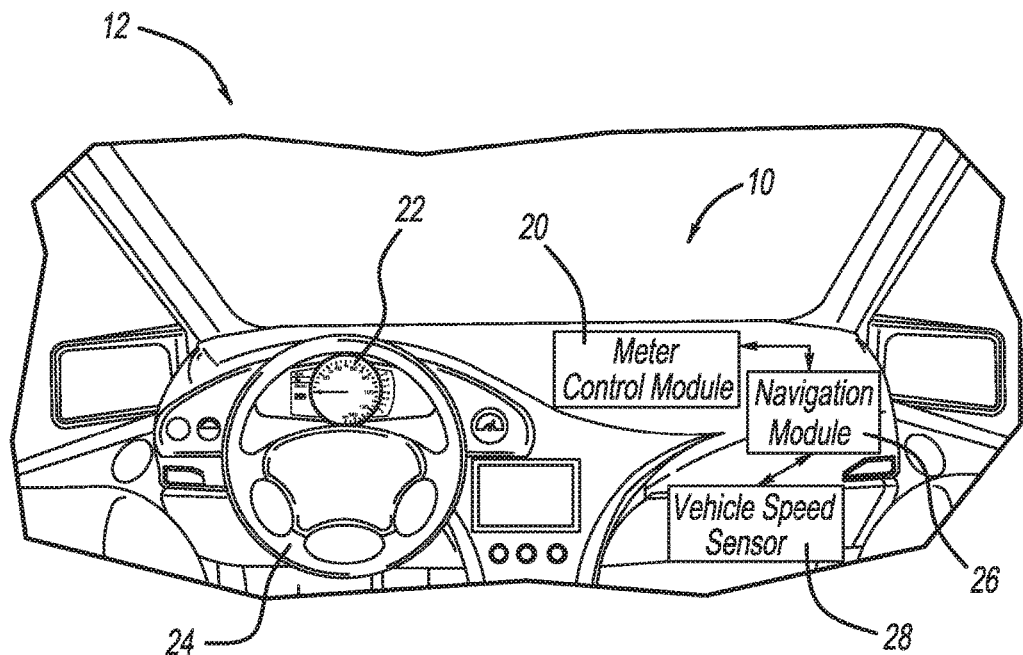
FIG. 1 illustrates an electronic meter cluster system according to the present teachings installed in an exemplary vehicle.

FIG. 1 illustrates an electronic meter cluster system according to the present teachings at reference numeral 10. The system 10 is illustrated as installed in an exemplary vehicle 12. The vehicle 12 may be any suitable type of vehicle, such as any suitable passenger vehicle, utility vehicle, construction vehicle, mass transit vehicle, commercial vehicle, motorcycle, watercraft, aircraft, etc. The electronic meter system 10 may also be installed in non-vehicles, such as building systems, power generating systems, military systems, etc.

The system 10 generally includes a meter control module 20, configured to control any suitable display screen, such as display screen 22. The display screen 22 can be any suitable electronic display screen. For example, the display screen 22 can be any suitable liquid crystal display (LCD), such as a thin-film transistor (TFT) display. The display screen 22 can be arranged at any suitable position within the vehicle 12, such as behind steering wheel 24.

The meter control module 20 is configured to receive inputs from a navigation module 26 and a vehicle speed sensor 28, as explained herein. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 2:
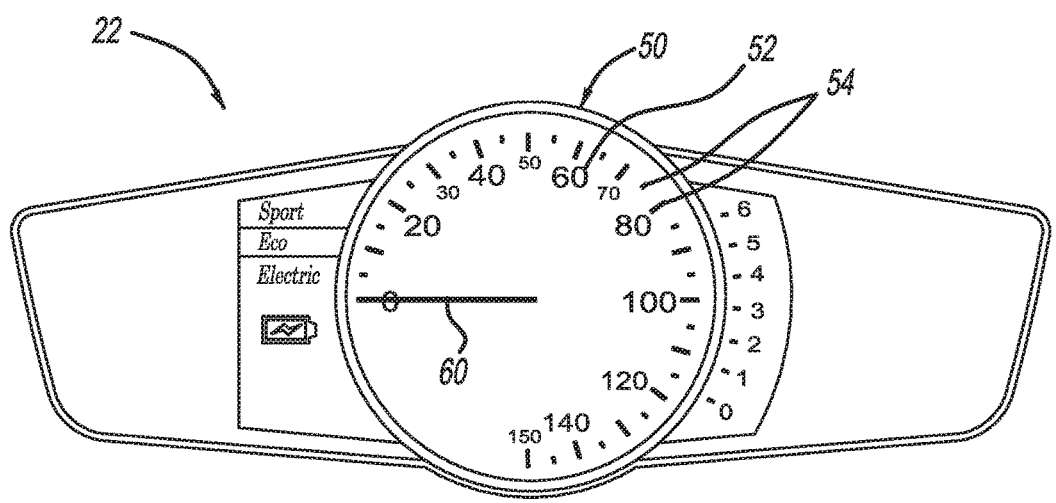
FIG. 2 illustrates an exemplary display screen of the system of FIG. 1, the display screen displaying a speedometer indicating that the vehicle is stationary.

With reference to FIG. 2, the display screen 22 includes at least one meter 50. The meter 50 can be any suitable meter for conveying any suitable information to the driver of the vehicle 12, such as vehicle speed, engine speed, fuel level, engine temperature, etc. In the example illustrated, the meter 50 is a speedometer. The meter 50 includes a plurality of numerals 52, and tick marks 54 at and between the numerals 52. At the center of the meter 50 is a needle 60, which can be arranged to point to, or between, any of the numerals 52 representing the speed of the vehicle 12. The meter control module 20 is configured to control the display screen 22 to arrange the needle 60 relative to the numerals 52.

The needle 60 is arranged relative to the numerals 52 based on inputs from the vehicle speed sensor 28 to the meter control module 20. The vehicle speed sensor 28 can be any suitable sensor configured to determine the speed of the vehicle 12. In the example of FIG. 2, the needle 60 is arranged at numeral "0" in response to the meter control module 20 receiving a signal from the vehicle speed sensor 28 indicating that the vehicle 12 is not moving, and thus the speed of the vehicle 12 is zero.

Figure 3A:
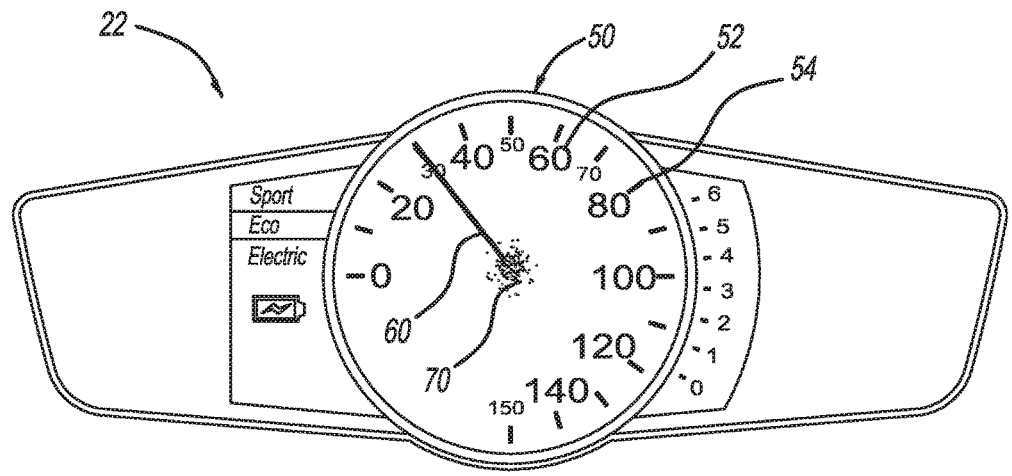
FIG. 3A illustrates the display screen of the system of FIG. 1, the display indicating that the vehicle is traveling at a first speed.

With reference to FIG. 3A, as the vehicle 12 begins to move, the vehicle speed sensor 28 inputs a signal to the meter control module 20 indicating the particular speed of the vehicle 12, which as illustrated in FIG. 3A is 30 miles per hour. In the example of FIG. 3A, as the vehicle speed increases, the meter control module 20 is configured to control the display screen 22 to decrease the number of tick marks 54 between the numerals 52, and increase the size of the numerals 52 (compare FIG. 2 to FIG. 3A, for example). To direct the driver's attention to the meter 50, the meter control module 20 may also control the display screen 22 to display a graphic 70 at a center of the meter 50, or at any other suitable position. The graphic 70 can be or include any suitable picture or photograph, or may be a colored area of the display screen 22. The meter control module 20 is configured to increase the size of the graphic 70 and/or change the color thereof as the speed of the vehicle 12 increases.

Figure 3B:
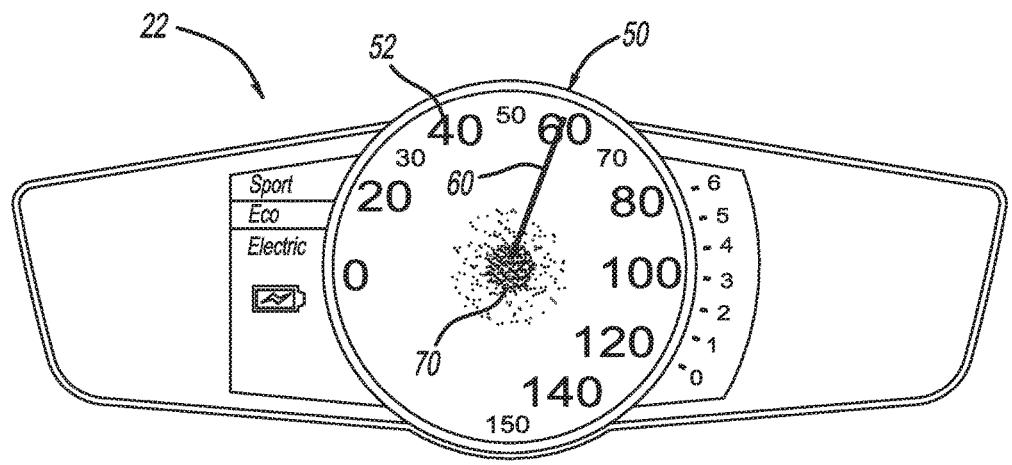
FIG. 3B illustrates the display screen of the system of FIG. 1, the display indicating that the vehicle is traveling at a second speed greater than the first speed.

With reference to FIG. 3B, as the speed of the vehicle 12 increases further, the meter control module 20 is configured to control the display screen 22 to further increase the size of the numerals 52, no longer display the tick marks 54, and if the graphic 70 is included, increase the size of the graphic 70 and/or change the color thereof (compare FIGS. 3A and 3B, for example). As a result, the driver's attention will be further directed to the meter 50, and the larger numerals 52 will advantageously make it easier for the driver to read the meter 50.

Figure 3C:
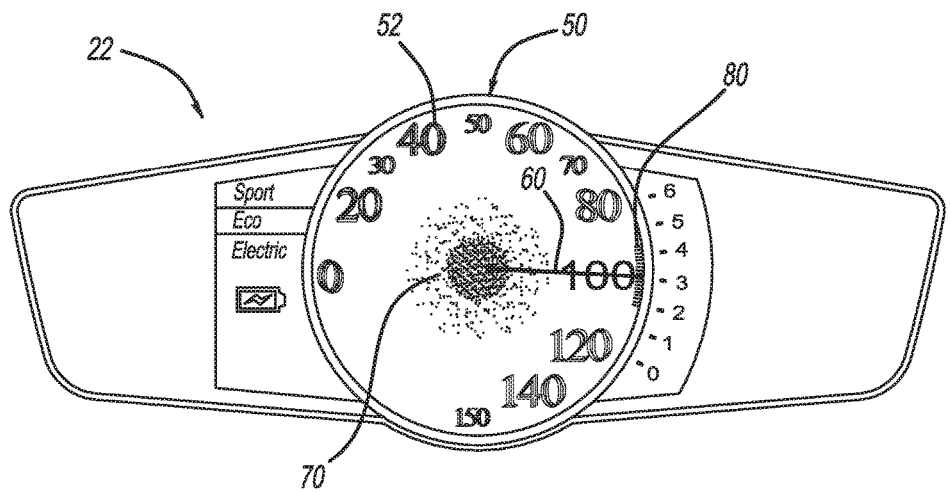
FIG. 3C illustrates the display screen of the system of FIG. 1, the display indicating that the vehicle is traveling at a third speed greater than the second speed.

With reference to FIG. 3C, when the speed of the vehicle 12 increases still further, as measured by the vehicle speed sensor 28, and the speed is maintained at or near such an elevated level for a predetermined period of time, the meter control module 20 is configured to control the display screen 22 to display a number of small or precise tick marks 80 near the needle 60 on opposite sides thereof to help the driver read the vehicle speed off of the meter 50 and provide the driver with a more precise speedometer reading. The meter control module 20 may also control the display screen 22 to extend the length of the needle 60 so that the needle 60 reaches the small tick marks 80. To focus the driver's attention on the current speed of the vehicle 12, the meter control module 20 can control the display screen 22 to blur all of the numerals 52, and all of the tick marks 54, spaced apart from the numeral 52 that the needle 60 is pointing to. Further, the meter control module 20 can control the display screen 22 to at least one of increase the size and brightness of the graphic 70, and/or change the color of the graphic 70. The meter control module 20 may also control the display screen 22 to change the graphic 70, such as change the picture displayed when the graphic 70 is a picture, such as a photograph.

Figure 4A:
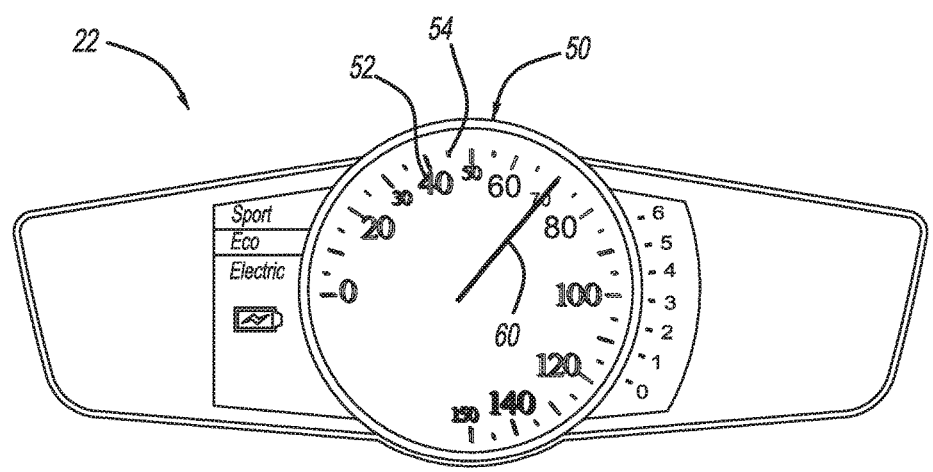
FIG. 4A illustrates the display screen of the system of FIG. 1 in another configuration according to the present teachings.
Figure 4B:
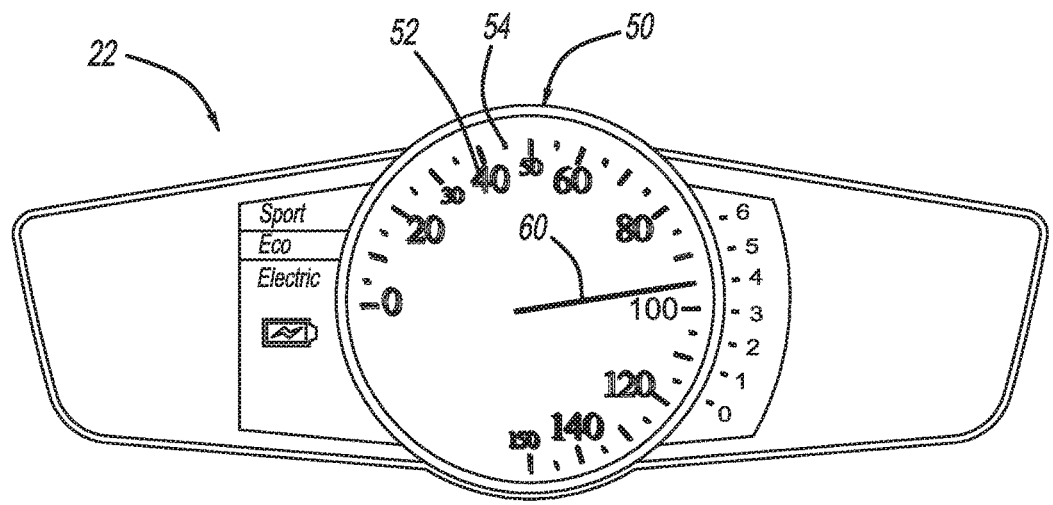
FIG. 4B illustrates the display screen of the system of FIG. 1 in yet another configuration according to the present teachings.

FIGS. 4A and 4B illustrate the display screen 22 and the meter 50 thereof controlled by the meter control module 20 in an alternative manner in accordance with the present teachings. With reference to FIG. 4A, as the speed of the vehicle increases, the meter control module 20 can control the display screen 22 to blur the tick marks 54 and the numerals 52 (except those numerals 52 and tick marks 54 that are proximate to the needle 60 and the current speed of the vehicle 12) towards a center of the meter 50 to represent motion. The meter control module 20 can further control the display screen 22 to increase the brightness of the needle 60. With reference to FIG. 4B, as the vehicle speed increases, the meter control module 20 is configured to control the display screen 22 to increase the number of numerals 52 and tick marks 54 that are blurred, and reduce the area about the needle 60 at which the numerals 52 and tick marks 54 are in focus. This advantageously further focuses the driver's attention on the needle 60 and facilitates reading of the meter 50.

The meter control module 20 can control the display screen 22 to configure the meter 50 as illustrated in FIG. 3B or FIG. 4A, for example, when the vehicle 12 approaches and/or reaches the speed limit of the road that the vehicle 12 is traveling on. The meter control module 20 can be informed of the speed limit by receiving an input from the navigation module 26. For example, the navigation module 26 can process GPS signals received by a GPS receiver of the vehicle 12 to identify the GPS coordinates of the vehicle 12. The navigation module 26 matches the GPS coordinates with map data and speed limit data to determine the road that the vehicle 12 is currently traveling on and the speed limit of the road in the area that the vehicle 12 is traveling. The meter control module 20 can thus advantageously direct the driver's attention to the meter 50 to inform the driver that he or she is about to, or has, exceeded the speed limit by configuring the meter 50 in the manner described above in the description of FIGS. 3B and 4A, for example. The meter control module 20 is also configured to operate the display screen 22 to highlight the numeral 52 corresponding to the speed limit of the road that the vehicle 12 is traveling on.

Figure 5:
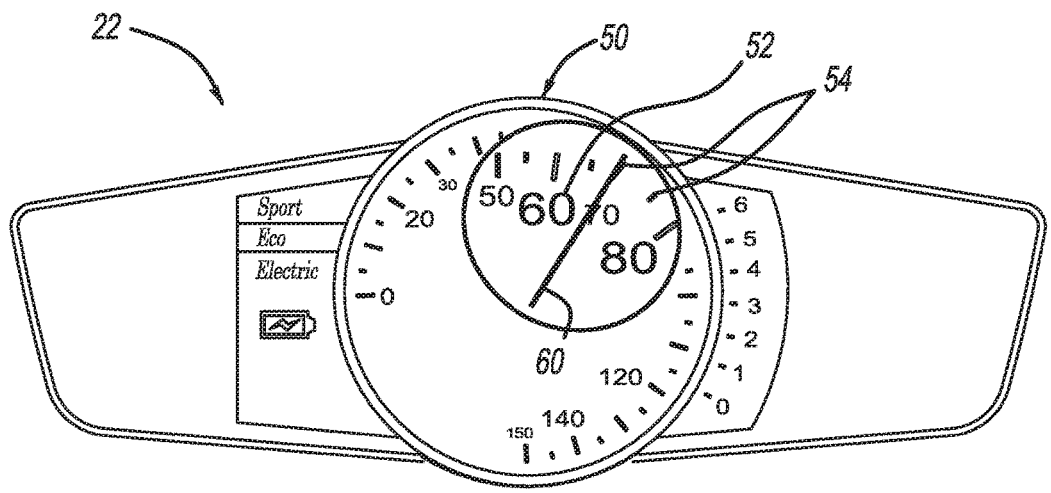
FIG. 5 illustrates the display screen of the system of FIG. 1 in another configuration according to the present teachings.

To assist the driver with reading the meter 50 when the vehicle 12 is being operated at high speeds, such as on a test track or other closed course, the control module 20 is configured to operate the display screen 22 in the manner described above in the descriptions of FIGS. 3C and 4B. With reference to FIG. 5, for example, the meter control module 20 is further configured to control the display screen 22 to gradually zoom in on (and thus increase the size of) the numeral 52 and tick marks 54 that the needle 60 is closest to as the vehicle speed increases. Then as the vehicle speed decreases, the meter control module 20 is configured to control the display screen 22 to zoom back out, and thus return the numeral(s) 52 and tick marks 54 to their standard sizes. The meter control module 20 may also be configured to control the display screen 22 such that at lower speeds, such as when the vehicle 12 is rounding a curve of a highway exit ramp, the numeral(s) 52 and tick marks 54 closest to the needle 60 are enlarged (or zoomed in on) to allow the driver to obtain a more precise meter reading.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electronic meter cluster system for a vehicle comprising:
    a display screen; and
    a meter control module configured to control the display screen to:
        display a meter for conveying information to a driver of the vehicle, the meter including numerals and a needle;
        arrange the needle relative to the numerals to convey information to the driver;
        based on a change in the information being conveyed to the driver, modify a brightness of the needle and a length of the needle;
        display tick marks between the numerals;
        blur tick marks towards a center of the meter as speed of the vehicle increases;
        reduce size of an area of the meter in which the numerals and tick marks are in focus as speed of the vehicle continues to increase towards and to the speed limit of the road that the vehicle is traveling on; and
        as speed of the vehicle is maintained for a predetermined period of time, blur numbers that are spaced apart from the number that the needle is closest to, enlarge an area of the display including the numeral that the needle is closest to, and display and zoom in on multiple additional tick marks proximate to the numeral that the needle is closest to.

2. The system of claim 1, wherein the meter control module is configured to control the display screen to convey to the driver at least one of vehicle speed, engine speed, engine temperature, and fuel level.

3. The system of claim 1, further comprising a navigation module configured to determine the vehicle's location, and identify a speed limit at the vehicle's location;
    wherein the meter control module is further configured to, in response to the vehicle approaching or reaching the speed limit, modify at least one of sharpness of the numerals, size of the numerals, one or more colors of the display, brightness of the needle, and length of the needle.

4. The system of claim 1, wherein the meter control module is further configured to control the display screen to, as vehicle speed increases, modify a center image or center color of the meter.

5. The system of claim 4, wherein the center image includes a picture.

6. The system of claim 1, wherein the meter control module is configured to control the display screen to, as speed of the vehicle is maintained for a predetermined period of time, increase brightness and sharpness of the needle.

7. The system of claim 1, wherein the meter control module is further configured to, as speed of the vehicle increases towards the speed limit, increase brightness of the needle and blur a background at a center of the display screen.

8. An electronic meter cluster system for a vehicle comprising:
a display screen; and
a meter control module configured to control the display screen to:
display a meter for conveying vehicle speed to a driver of the vehicle, the meter including numerals, tick marks between the numerals, and a needle for pointing at the tick marks and numerals to convey vehicle speed to the driver;
arrange the needle relative to the numerals and tick marks to convey vehicle speed to the driver;
display fewer tick marks as vehicle speed increases, and display no tick marks when vehicle speed is above a predetermined threshold;
increase size of the numerals as vehicle speed increases; and
after vehicle speed remains above the predetermined threshold for a predetermined period of time, display multiple tick marks on opposite sides of the numeral that the needle is closest to between the numeral that the needle is closest to and numerals directly adjacent thereto.

9. The system of claim 8, wherein the meter control module is further configured to control the display screen to display a graphic at a center of the meter, and increase the size of the graphic as vehicle speed increases; wherein the graphic includes at least one of a picture and a colored area.

10. An electronic meter cluster system for a vehicle comprising:
a display screen; and
a meter control module configured to control the display screen to:
display a meter for conveying vehicle speed to a driver of the vehicle, the meter including numerals, tick marks between the numerals, and a needle for pointing at the tick marks and numerals to convey vehicle speed to the driver;
arrange the needle relative to the numerals and tick marks to convey vehicle speed to the driver;
as vehicle speed increases, blur the tick marks towards a center of the meter and increase brightness of the needle;
blur the numerals and the tick marks distal to the numerals and tick marks that the needle is closest to as the vehicle speed reaches a speed limit of a road that the vehicle is traveling on; and
blur additional numerals and tick marks as the vehicle speed increases above the speed limit such that the number of tick marks and numerals in focus decreases as the vehicle speed increases.

11. The system of claim 10, wherein the meter control module is further configured to zoom in on the numerals and tick marks closest to the needle as the vehicle speed increases, and zoom out of the numerals and tick marks closest to the needle as the vehicle speed decreases.

* * * * *